United States Patent
Lavalley-Maillet et al.

(10) Patent No.: US 9,926,226 B2
(45) Date of Patent: Mar. 27, 2018

(54) NATURAL COLD SURFACE TREATMENT FOR HOLLOW GLASS ITEMS

(71) Applicant: SAINT-GOBAIN EMBALLAGE, Courbevoie (FR)

(72) Inventors: Perrine Lavalley-Maillet, Marcilly les Buxy (FR); Aurelie Descorps-Declere, Alfortville (FR); Edouard Obert, Coye la Foret (FR); Claude Da Silva, Aulnay sous Bois (FR)

(73) Assignee: SAINT-GOBAIN EMBALLAGE, Courbevoie (FR)

( * ) Notice: Subject to any disclaimer, the term of this patent is extended or adjusted under 35 U.S.C. 154(b) by 683 days.

(21) Appl. No.: 14/391,786

(22) PCT Filed: Apr. 11, 2013

(86) PCT No.: PCT/FR2013/050782
§ 371 (c)(1),
(2) Date: Oct. 10, 2014

(87) PCT Pub. No.: WO2013/153332
PCT Pub. Date: Oct. 17, 2013

(65) Prior Publication Data
US 2015/0079319 A1 Mar. 19, 2015

(30) Foreign Application Priority Data
Apr. 11, 2012 (FR) .................................... 12 53305

(51) Int. Cl.
*C03C 17/28* (2006.01)
*C03C 17/00* (2006.01)
*C03C 17/32* (2006.01)

(52) U.S. Cl.
CPC ............ *C03C 17/28* (2013.01); *C03C 17/005* (2013.01); *C03C 17/32* (2013.01); *C03C 2217/78* (2013.01); *C03C 2218/112* (2013.01); *Y10T 428/1317* (2015.01)

(58) Field of Classification Search
CPC ....... C03C 17/32; C03C 17/00; C03C 17/008; C03C 2217/78; C03C 17/005; C03C 17/28; C03C 2218/112; C08L 29/04; C08L 2666/02; Y10T 428/1317; Y10T 428/31641; Y10T 428/31645; C09D 189/00; C09D 193/00
See application file for complete search history.

(56) References Cited

U.S. PATENT DOCUMENTS

| | | | |
|---|---|---|---|
| 3,445,275 A | 5/1969 | Bogart et al. | |
| 3,525,636 A | 8/1970 | Bogart | |
| 3,997,693 A | 12/1976 | Kircher | |
| 5,019,403 A * | 5/1991 | Krochta | A23B 4/10 426/100 |
| 6,403,175 B1 * | 6/2002 | Speier | C03C 17/30 427/387 |
| 6,433,053 B1 * | 8/2002 | Kasturi | C11D 3/18 428/537.5 |
| 2003/0099827 A1* | 5/2003 | Shih | B32B 7/12 428/343 |
| 2005/0003973 A1 | 1/2005 | Lewis et al. | |
| 2007/0240823 A1* | 10/2007 | Alevisopoulos | C09J 103/02 156/336 |

FOREIGN PATENT DOCUMENTS

| | | |
|---|---|---|
| SU | 1 315 406 | 6/1987 |
| SU | 1 627 529 | 2/1991 |

OTHER PUBLICATIONS

International Search Report dated Jul. 25, 2013 in PCT/FR13/050782 Filed Apr. 11, 2013.

* cited by examiner

*Primary Examiner* — Yan Lan
(74) *Attorney, Agent, or Firm* — Oblon, McClelland, Maier & Neustadt, L.L.P.

(57) ABSTRACT

The invention relates to:
- a composition for the cold-end treatment of hollow glass articles, characterized in that it is an aqueous solution containing 0.01% to 1% by weight of solids of carnauba wax;
- a process for the cold-end treatment of hollow glass articles, comprising the spraying of this composition; and
- a hollow glass article thus obtained.

13 Claims, No Drawings

NATURAL COLD SURFACE TREATMENT FOR HOLLOW GLASS ITEMS

The present invention relates to the manufacture of hollow glass articles such as bottles, phials, jars, and in particular to their cold-end surface treatment, often referred to as cold-end treatment.

These articles are manufactured in a known manner from molten glass parisons shaped in moulds according to various blowing and/or pressing processes. A blank may be formed in a blank mould, then transferred to a finish mould. The moulds may be installed on an IS (Individual Section) machine.

On leaving the finish mould, the articles at a relatively high temperature of 530° C. to 550° C. are subjected to a treatment often referred to as hot-end treatment, for example by chemical vapour deposition (CVD) of tin tetrachloride $SnCl_4$. The objective of this hot-end treatment is to give a first protection against scratching (contact with the transfer wheel and/or the stacker) and also to act as a tie for the cold-end treatment.

These articles may then be transferred to an annealing lehr where they are reheated then cooled at a controlled rate from 550° C. to 150° C. in order to release the stresses in the glass. On leaving the annealing lehr, the articles cooled to a temperature of 110° C. to 150° C. may then be subjected to a "cold-end" treatment, again by spraying of a composition. The cold-end treatment may have several objectives. It aims in particular to increase the scratch resistance of the articles, that is to say to prevent scratches from forming, or to delay their formation when the articles knock together while being conveyed, downstream of the annealing lehr. Another function of the cold-end treatment is to facilitate the sliding of the articles over one another when they come into contact while being conveyed. This facilitated sliding is correlated to the reduction in the formation of scratches.

The objective of the present invention is to provide a cold-end treatment via a composition of natural origin, which makes it possible to limit the sources of pollution when it comes to the synthesis of the constituents of the treatment composition, and the cold-end treatment itself, it being possible for the optionally discharged excesses of treatment composition to be exclusively of natural origin and harmless with respect to the environment.

This objective has been achieved by the invention, one subject of which is, consequently, a composition for the cold-end treatment of hollow glass articles, which consists of an aqueous solution containing 0.01% to 1% by weight of solids of carnauba wax.

The latter is derived from the leaves of *Copernicia prunifera*, has the CAS No. 8015-86-9, has a melting point of around 90° C., has a certain hardness at ambient temperature, and a compatibility with direct food contact. The latter property is required when the article is intended to contain a food product and when the cold-end treatment is carried out by aerial (that is to say overhead) spraying which does not exclude a small fraction of the treatment composition from penetrating inside the article.

Carnauba wax gives the article properties of sliding (in particular over another article) and increases its scratch resistance, as seen in greater detail hereinafter.

According to preferred characteristics:
the composition contains at least 0.04%, preferably 0.07%, by weight of solids of carnauba wax;
the composition contains at most 0.4%, preferably 0.2%, by weight of solids of carnauba wax;
the composition contains 0.07% to 0.8% by weight of solids of wheat gluten, which is soluble in water, has a water absorption capacity and gives the article compatibility with all the aqueous adhesives used for the adhesive bonding of labels, even at the locations of the surface of the article where the thickness of the cold-end treatment coating is greater (bottle shoulder for example);
the composition contains at least 0.1%, preferably 0.15%, by weight of solids of wheat gluten;
the composition contains at most 0.6%, preferably 0.4%, by weight of solids of wheat gluten;
the composition contains at least 0.1% by weight of solids of rosin; the latter, of CAS No. 8050-09-7, has adhesive properties and a high hardness; it makes it possible here to considerably increase the scratch resistance without adversely affecting the sliding properties; the maximum rosin content is not limited but, for cost reasons, it may not exceed, in order of increasing preference, 5%, 3%, 2%, 1.5%, 1% and 0.8% by weight of solids;
the composition contains at least 0.2% by weight of solids of rosin;
the composition contains at most 0.6% by weight of solids of rosin.

Other subjects of the invention are:
a process for the cold-end treatment of hollow glass articles, comprising the spraying of a composition described previously; and
a hollow glass article obtained by this process; this is especially an article of which the surface comprises, over a variable thickness, for example from 1 nm to 1 μm, carnauba wax.

The invention is now illustrated by the following examples.

EXAMPLE 1

In this example, 75 cl, 300 g, Burgundy-type bottles resulting from one and the same production (same composition, same IS machine, simultaneous production) are treated.

The sliding properties of the bottles with respect to one another are evaluated. In order to do this, two bottles are constrained in direct contact, side against side, on an inclinable plane, a third bottle is placed on the first two bottles, and the angle of inclination of the plane from which the third bottle begins to slide is measured.

In the absence of any cold-end treatment, this angle is around 25°.

Irrespective of the cold-end treatment composition, it is possible to adjust the parameters of the treatment process so as to obtain a desired sliding angle: these parameters are, for example, the spraying flow rate and duration.

In this example, use is exclusively made of aerial (overhead) spraying, the parameters of which are adjusted in order to obtain, each time, a sliding angle of 10°.

The scratch resistance of the bottles is evaluated according to the following protocol. Two bottles are held one on top of the other, their longitudinal axes in perpendicular position with respect to one another, with a force of 30 kg. The upper bottle is fixed, the lower bottle being moveable in translation back and forth along the bisection of the projection of the longitudinal axes of the two bottles, with a frequency of 2 Hz and an amplitude of 16 mm.

In the examples of this application, all the cold-end treatment compositions are exclusively aqueous.

In a first test, a bottle is cold-end treated with a 0.2% solid content polyethylene wax composition. 175 cycles are observed before scratching.

In a second test, a bottle is cold-end treated with a 0.14% solids content carnauba wax composition. 148 cycles are observed before scratching. This value expresses a significant improvement in the scratch resistance.

However, the adhesive bonding of labels is problematic: 100% easy unsticking of the label is observed 24 h after adhesive bonding, irrespective of the adhesive used.

EXAMPLE 2

Via the cold-end treatment, a sliding angle of 10° is obtained.

In a third test, the second test is reproduced by adding, to the treatment composition, an amount of wheat gluten equal to that of carnauba wax: the adhesive bonding of the label is good with casein, and poor with starch.

In a fourth test, the second test is reproduced by adding, to the treatment composition, an amount of wheat gluten which is double that of carnauba wax: the adhesive bonding is excellent with casein and starch, the label tearing without unsticking 24 h after adhesive bonding.

Wheat gluten is therefore a good auxiliary agent for improving the adhesive bonding of the labels.

EXAMPLE 3

Via the cold-end treatment, a sliding angle of 10° is obtained.

A batch of bottles similar to those described previously, but which nevertheless differ therefrom by several aspects of their manufacturing process, is treated here.

The first test is reproduced, which constitutes the fifth test: the average scratch resistance is 10 cycles.

The third test is reproduced, which constitutes the sixth test: the average scratch resistance is 19 cycles.

In a seventh test, the sixth test is reproduced by adding, to the treatment composition, an amount of rosin that is triple that of carnauba wax on the one hand and of wheat gluten on the other hand: the average scratch resistance is 159 cycles.

The effectiveness of rosin as an auxiliary agent for increasing the scratch resistance is thus established.

This example also shows that the evaluation of the scratch resistance is relative to a given production of bottles. Thus, the values obtained in the first and third and respectively fifth and sixth tests are very different. Between the two batches of bottles, the hot-end treatments in particular differed.

EXAMPLE 4

On another batch of bottles of the same type as mentioned previously, cold-end treatments are carried out so as to obtain, this time, a sliding angle of 15°.

The compositions below are expressed by weight of solids in water.

In the eighth test, the treatment composition contains 0.14% of carnauba wax and 0.33% of rosin.

The ninth, tenth and eleventh tests are obtained by adding, to this composition of the eighth test, 0.14%, respectively 0.22% and respectively 0.29% of wheat gluten.

The performances are recorded in the table below.

| Test | Number of cycles before scratching | Aqueous adhesive bonding (starch) | Aqueous adhesive bonding (casein) |
| --- | --- | --- | --- |
| Eight | 144 | Poor | Average |
| Ninth | 187 | Poor | Good |
| Tenth | 170 | Average | Good |
| Eleventh | 221 | Good | Good |

Poor adhesive bonding: 100% of the label becomes unstuck 24 h after the adhesive bonding.

Average adhesive bonding: a portion of the label becomes unstuck.

Good adhesive bonding: the label cannot be unstuck, it tears.

The values obtained in this table corroborate, in all respects, the observations from the preceding examples.

The invention claimed is:

1. A composition consisting of:
water,
greater than 0% and at most 0.6% by weight of solids of rosin,
0.01% to 1% by weight of solids of carnauba wax, and
0.07% to 0.8% by weight of solids of wheat gluten.

2. The composition according to claim 1, consisting of said water, said solids of rosin, said wheat gluten, and from 0.04% to 1% by weight of said solids of carnauba wax.

3. The composition according to claim 1, consisting of said water, said solids of rosin, said wheat gluten, and 0.01% to 0.4% by weight of said solids of carnauba wax.

4. The composition according to claim 1, consisting of said water, said solids of rosin, said wheat gluten, and 0.07% to 1% by weight of said solids of carnauba wax.

5. The composition according to claim 1, consisting of said water, said solids of rosin, said wheat gluten, and 0.01% to 0.2% by weight of said solids of carnauba wax.

6. The composition according to claim 1, consisting of said water, said solids of rosin, said carnuba wax, and 0.1% to 0.8% by weight of said solids of wheat gluten.

7. The composition according to claim 1, consisting of said water, said solids of rosin, said carnuba wax, and 0.07% to 0.6% by weight of said solids of wheat gluten.

8. The composition according to claim 1, consisting of said water, said solids of rosin, said carnuba wax, and 0.15% to 0.8% by weight of said solids of wheat gluten.

9. The composition according to claim 1, consisting of said water, said solids of rosin, said carnuba wax, and 0.07% to 0.4% by weight of said solids of wheat gluten.

10. The composition of claim 1, consisting of said water, said solids of wheat gluten, said carnuba wax, and at least 0.1% by weight to 0.6% by weight of said solids of rosin.

11. The composition of claim 1, consisting of said water, said solids of wheat gluten, said carnuba wax, and at least 0.2% by weight to 0.6% by weight of said solids of rosin.

12. A process for cold-end treatment of a hollow glass article, the process comprising spraying the composition according to claim 1 on said hollow glass article.

13. A hollow glass article obtained by the process according to claim 12.

* * * * *